United States Patent [19]

Pressman et al.

[11] Patent Number: 4,645,872
[45] Date of Patent: Feb. 24, 1987

[54] VIDEOPHONE NETWORK SYSTEM

[75] Inventors: Norman J. Pressman, Baltimore; John K. Frost, Lutherville, both of Md.

[73] Assignee: John Hopkins University, Baltimore, Md.

[21] Appl. No.: 861,665

[22] Filed: May 6, 1986

Related U.S. Application Data

[63] Continuation of Ser. No. 364,451, Apr. 1, 1982, abandoned.

[51] Int. Cl.[4] .................... H04M 11/00; H04M 3/56; H04N 7/14
[52] U.S. Cl. ....................................... 379/54; 358/85; 379/202
[58] Field of Search ............. 179/2 TV, 2 TS, 18 BC, 179/99 LS; 358/85; 455/5; 370/62

[56] References Cited

U.S. PATENT DOCUMENTS

| | | | |
|---|---|---|---|
| 3,587,053 | 6/1971 | Horzepa et al. | |
| 3,649,761 | 3/1972 | Bush et al. | 179/2 TS |
| 3,678,207 | 7/1972 | Schon | 179/2 TV X |
| 3,706,996 | 12/1972 | Hafner | |
| 3,718,770 | 2/1973 | Reese | 179/2 TS X |
| 3,974,337 | 8/1976 | Tatsuzawa | 179/2 TV |
| 4,004,084 | 1/1977 | Brown et al. | 179/2 TS X |
| 4,054,908 | 10/1977 | Poirier et al. | 179/2 TS X |
| 4,059,735 | 11/1977 | Betts | 179/18 BC |
| 4,097,694 | 6/1978 | Miyazaki | 179/18 BC X |
| 4,150,259 | 4/1979 | Fenton et al. | 179/18 BC |
| 4,229,814 | 10/1980 | Betts | |
| 4,295,008 | 10/1981 | Johnson et al. | 179/18 BC |
| 4,322,581 | 3/1982 | Christain et al. | |
| 4,330,886 | 5/1982 | Fukuda et al. | 370/62 |
| 4,386,365 | 5/1983 | Gargini | 358/85 |
| 4,455,647 | 6/1984 | Gueldner | 370/62 |
| 4,516,156 | 5/1985 | Fabris et al. | 358/85 |

FOREIGN PATENT DOCUMENTS 41902 12/1981 European Pat. Off. ......... 179/2 TV

OTHER PUBLICATIONS

Kikuchi et al., "New Video Conference System", *Japan Telecommunications Review*, vol. 22, No. 2, Apr. 1980, pp. 112–119.

Primary Examiner—Keith E. George
Attorney, Agent, or Firm—Cushman, Darby & Cushman

[57] ABSTRACT

A controlled access automated-switching conferencing system includes a special microprocessor-controlled control console disposed at each of a plurality of stations. Each station includes video and audio inputs and outputs. Central automatic video and audio switching devices switch the video and audio inputs so that they may be connected to any one or more of the video and audio outputs, and switch the audio outputs so that they may be connected to one or more audio inputs. A central novel system controller controls the automatic switchers in response to selections of function and station selection members associated with any of the control consoles. An interface is associated with each station for operatively interconnecting the station control console, inputs, and outputs with the system controller, and a central line driver interfaces the system controller with the interface structure. The control console function select members have hold, call, cancel, and alternate video functions and a test function for the microprocessor.

28 Claims, 12 Drawing Figures

VIDEOPHONE NETWORK SYSTEM

This is a continuation of application Ser. No. 364,451, filed Apr. 1, 1982, which was abandoned upon the filing hereof.

BACKGROUND AND SUMMARY OF THE INVENTION

There are many situations where conferencing between a number of stations for data analysis, input and retrieval (machine or human) are desirable. A typical common use for such conferencing is a teleconference system between a number of stations, each having audio and video capability, so that research, consultation and educational information and equipment can be shared between individuals at the various stations. Typically, control sequences and mechanisms for such systems have been cumbersome. Conventionally, systems usually can be patched either mechanically or electronically for conference purposes from an operator position.

According to the present invention, a conferencing system, and components, are provided which overcome the drawbacks associated with conventional systems while at the same time providing greater flexibility in utilization. The invention accomplishes these desirable results with automatic switching so that there are no predefined networks, and no hard-wiring from each station directly to each other station is necessary. The operator at each station is his own "master", and has complete control in setting up the networks without redundant wiring. At each station the master has the flexibility to interconnect with each other station individually, or collectively, and to receive or refuse transmissions at will.

The controlled access automated switching conferencing system according to the present invention is ideally suited for use in teleconferencing, wherein audio and video inputs and outputs are provided at each station. However the invention has broader applicability, being applicable to emergency and building security systems, data sharing systems, and a wide variety of other functions.

In a typical installation of, for example, 20 stations, each station would include a video source (e.g. a high resolution color or monochrome camera), video display, microphone and speaker as inputs and outputs. Each station would also include a microprocessor-controlled control console which would include function and station selection members, e.g. pushbuttons. Central automatic video and audio switching means are provided for switching the inputs from each station so that they may be connected to any one or more other stations, and include a central system control means for controlling the video and audio switching means in response to selections of function and station selection members associated with any of the control consoles. The combination of a microprocessor-controlled control console at each station, and the central system control means with automatic audio and video switching means, allows any desired network to be set up between stations without hard-wiring from each station directly to each other station, allows each station to act as a "master", and allows parallel and private networks to be set up.

The system according to the invention also includes an interface means associated with each station for operatively interconnecting that station's control console, inputs and outputs with the system control means, and for providing power to the control console. The interface means are for convenience of installation and for safety, allowing only low voltage to be fed to the control consoles. A central line driver means interfaces the system control means with the interface means.

The system may also be utilized with one or more accessory stations, which accessory stations need not have a control console and video and audio inputs and outputs, but rather may include other inputs and/or outputs. Typical of such accessory stations would be a central computer, a video recorder or playback station, and a computerized interactive color image graphics system, or the like. These accessory stations can analyze, assimilate, or otherwise act upon data transmitted from any of the other stations or may transmit data to the other stations upon call. Each accessory station also would include its own interface means for operatively interconnecting its input and/or output to the system control means for ultimate switching by the automatic switching means.

The control console function select members may comprise a hold function selecting means, a call function selecting means, a cancel function selecting means, an alternate video function selecting means, and a microprocessor test function selecting means. Each select member may have two different colored LEDs associated therewith for indicating the status of the station (e.g. unconnected, connected, or busy), with the off mode of each indicator indicating no network is established with that station. Polling circuitry means are associated with the central switcher so that the status of the control console is continuously (e.g. 1,000 times per second) scanned to determine the status of the select members. A RAM and ROM are provided in the control console, operatively connected to the microprocessor.

The stations may all be located in the same general area, or may be widely geographically spaced, and by selecting the appropriate automatic switching means and communicating means any number of stations may be provided in the system.

It is the primary object of the present invention to provide a relatively simple yet exceptionally versatile conferencing system. This and other objects of the invention will become clear from an inspection of the detailed description of the invention and from the appended claims.

BRIEF DESCRIPTION OF THE DRAWINGS

FIG. 7 is a block schematic illustrating exemplary control data interface structures according to the invention;

DETAILED DESCRIPTION OF THE DRAWINGS

Figure 1:
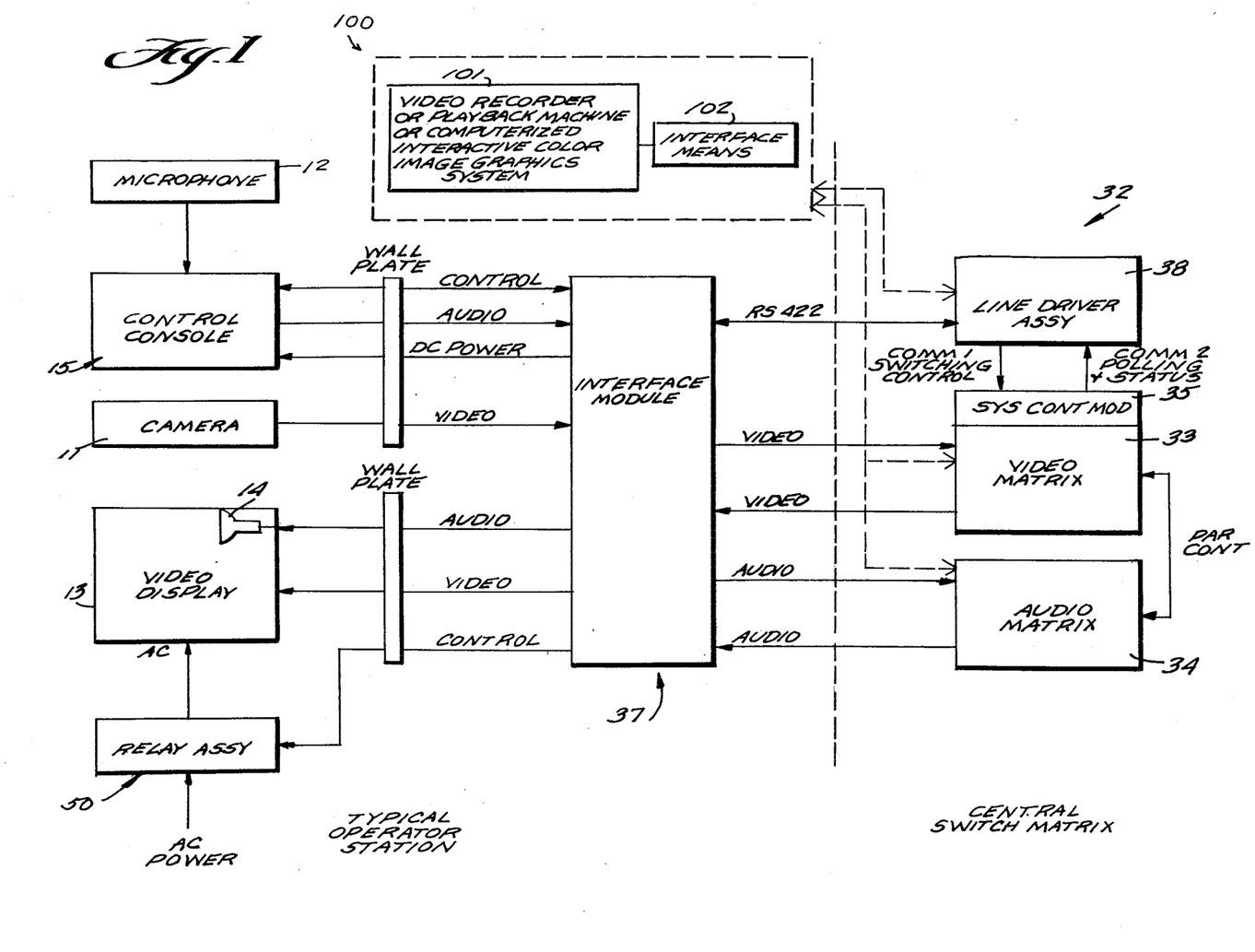
FIG. 1 is a block diagram illustrating a typical operator station according to the present invention in association with the central switch matrix components.

An exemplary controlled access automated switching conferencing system according to the present invention is illustrated schematically in FIG. 1. Only one of the operator stations is illustrated in FIG. 1 but a plurality of operator stations (e.g. 20) are provided, each connected in an identical manner to a central switch matrix assembly (32, see right-hand side of FIG. 1) of the system.

Each station 10 preferably includes first and second distinct input devices and first and second distinct output devices. For convenience of description, the first input will be described as a camera, or other video source, 11, and the second input will be described as a microphone, or like audio input 12; and the first output will be described as a video display 13, and the second output as a speaker 14; however, it is to be understood that these descriptions are only exemplary, and a wide variety of inputs and outputs may be provided.

Figure 2:
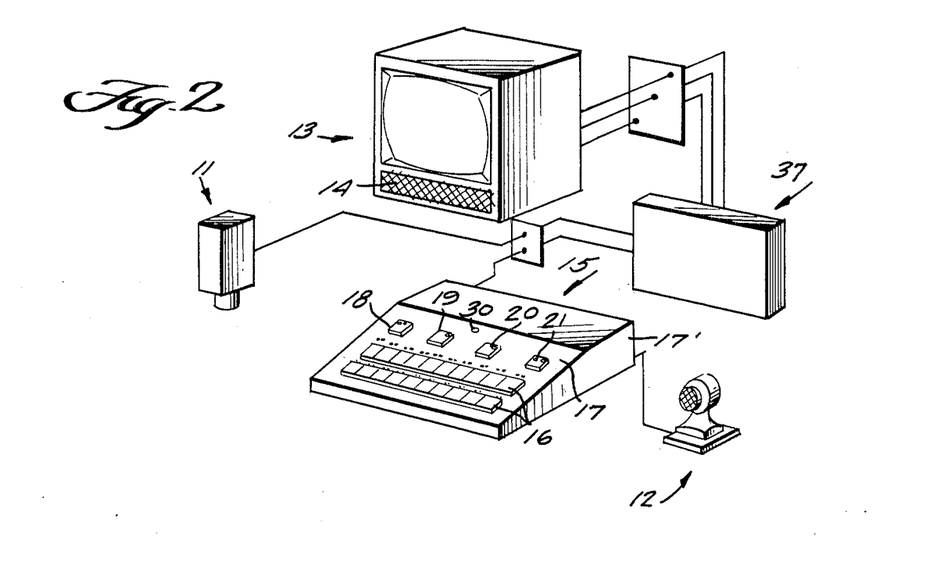
FIG. 2 is an exemplary station schematic illustration.
Figure 3:
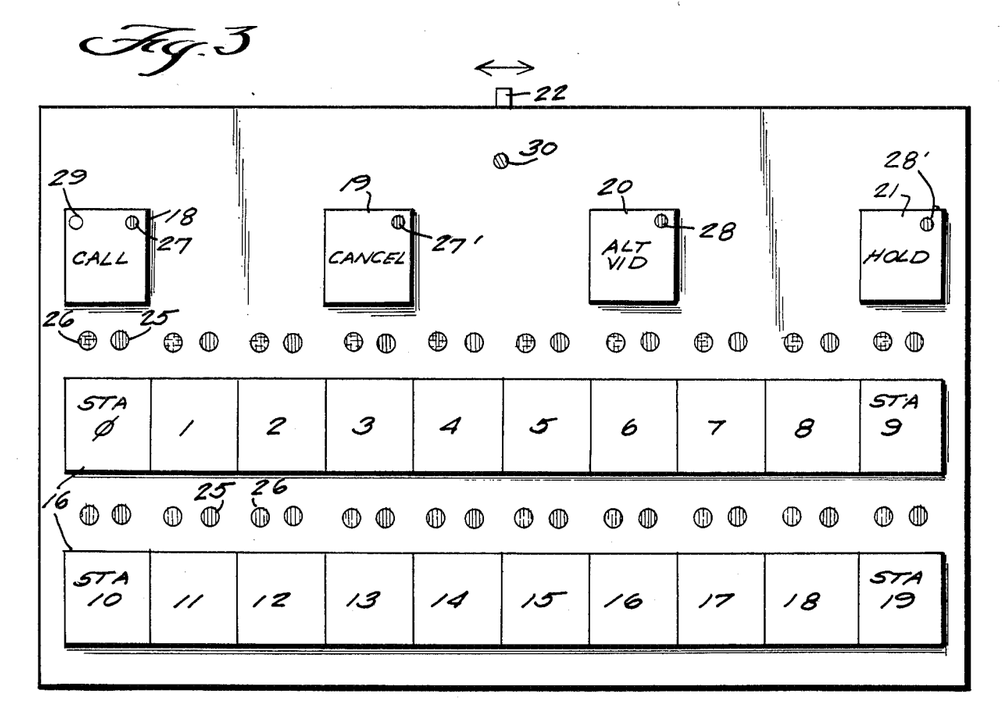
FIG. 3 is a top plan view of an exemplary control console control panel with function and station select members.

At each station a microprocessor-controlled control console 15 is provided. The control console, which is best seen in FIGS. 2 and 3, includes a plurality of function and station selection members, including a station selection member for each of the plurality of stations in the system. The station select members are indicated by pushbuttons 16 extending through a cover panel 17 of the casing 17' for the control console 15. The function selection members are illustrated by pushbuttons 18, 19, 20, 21 and 22.

The control console also includes a plurality of indicators to indicate the status of the function and station selection members. Preferably a pair of light emitting diodes, or other light indicators, of different color are associated with each station selection button 16, such as a red LED 25 and a yellow LED 26. Various of the function selection buttons also have an indicator associated therewith, such as red LEDs 27, 27', 28, and 28' associated with call, cancel, alternate video, and hold buttons 18-21, respectively a yellow LED 29 associated with call button 18, and a green LED 30 associated with test switch 22. The selection and indication members are operatively connected to a microprocessor 31' mounted within the casing 18.

The system according to the invention further includes as part of the central switch matrix 32 (see FIG. 1) automatic first and second switching means for switching the first and second inputs so that they may be connected to any one or more of the first and second outputs. Typically the first automatic switching means would be a video automatic switching means 33, and the second automatic switching means would be an audio automatic switching means 34. A central system control means 35 controls the video and audio switching means 33, 34 in response to selections of function and station selection members 16 and 18-21 associated with any of the control consoles 15.

At each station 10 a further component 37 of the system according to the invention is provided. The component 37 comprises an interface means (module) for operatively connecting each station control console 15, inputs 11, 12 and outputs 13, 14 with the system control means 35, and provides electrical power for the control console 15. As illustrated in FIG. 1, the interface means 37 preferably is mounted inside the wall of the room in which the station 10 is located, and preferably is provided in an integral junction box to which all wiring connections are made. The interface module 37 facilitates installation and maintenance, and enhances safety, only low voltages being supplied from outside the room to the console 15. A central line driver means, which is part of the central switch matrix 32, interfaces the system control means 35 with the interface module 37.

Figure 4:
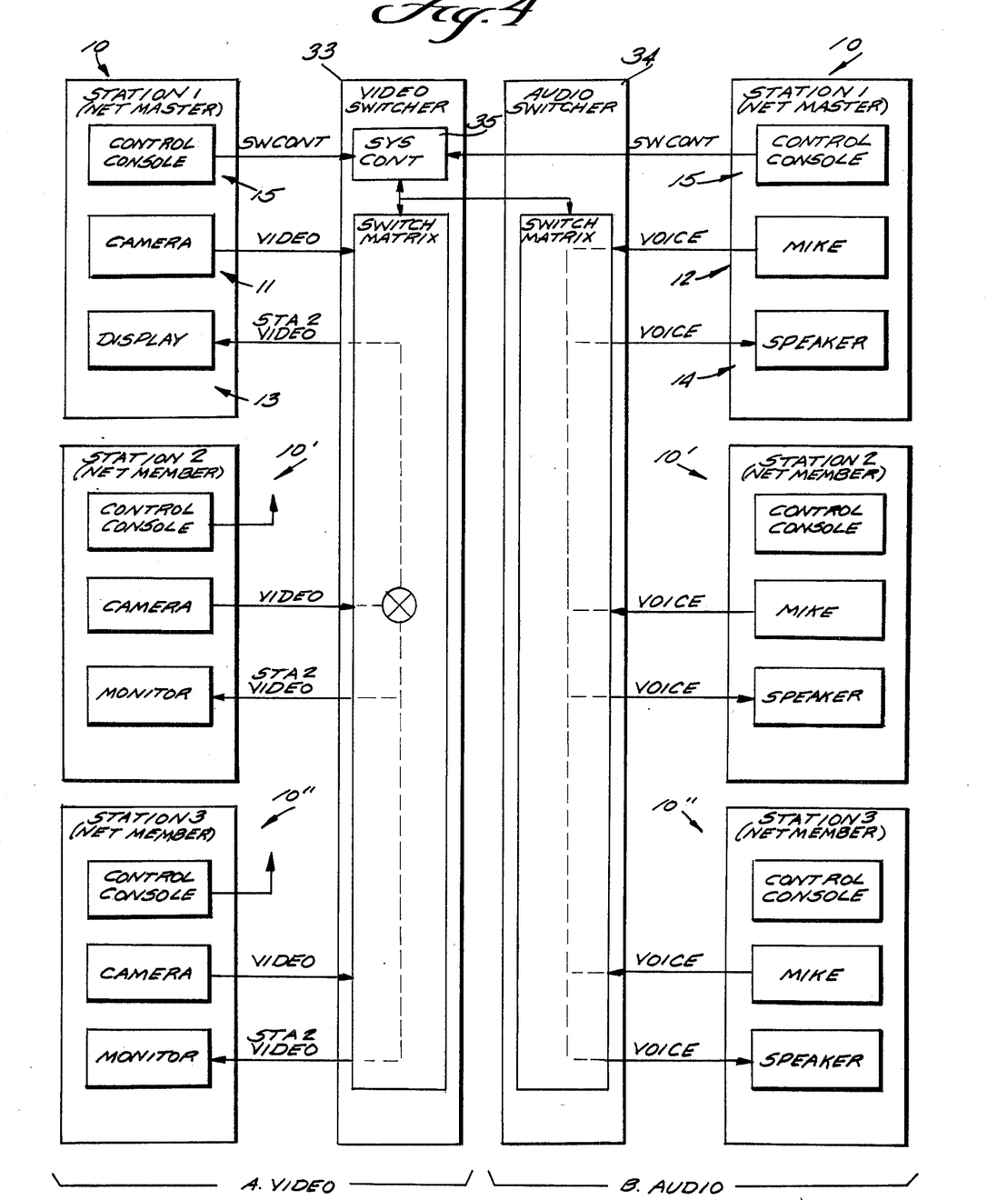
FIG. 4 is a simplified block diagram showing a typical conference network set up between three stations.

A typical conference network that may be set up according to the invention is illustrated schematically in FIG. 4. The operator at any station 10 can be the "master", and select any net members he chooses, which members have the option of answering the call from the master, or putting it on hold, or refusing to answer. Parallel systems may be set up, and new members may be added or dropped out of the network as desired by the net master.

The basic components of the system according to the invention having been described, details of the preferred embodiment of each of the components will now be set forth.

Control Console

Figure 5:
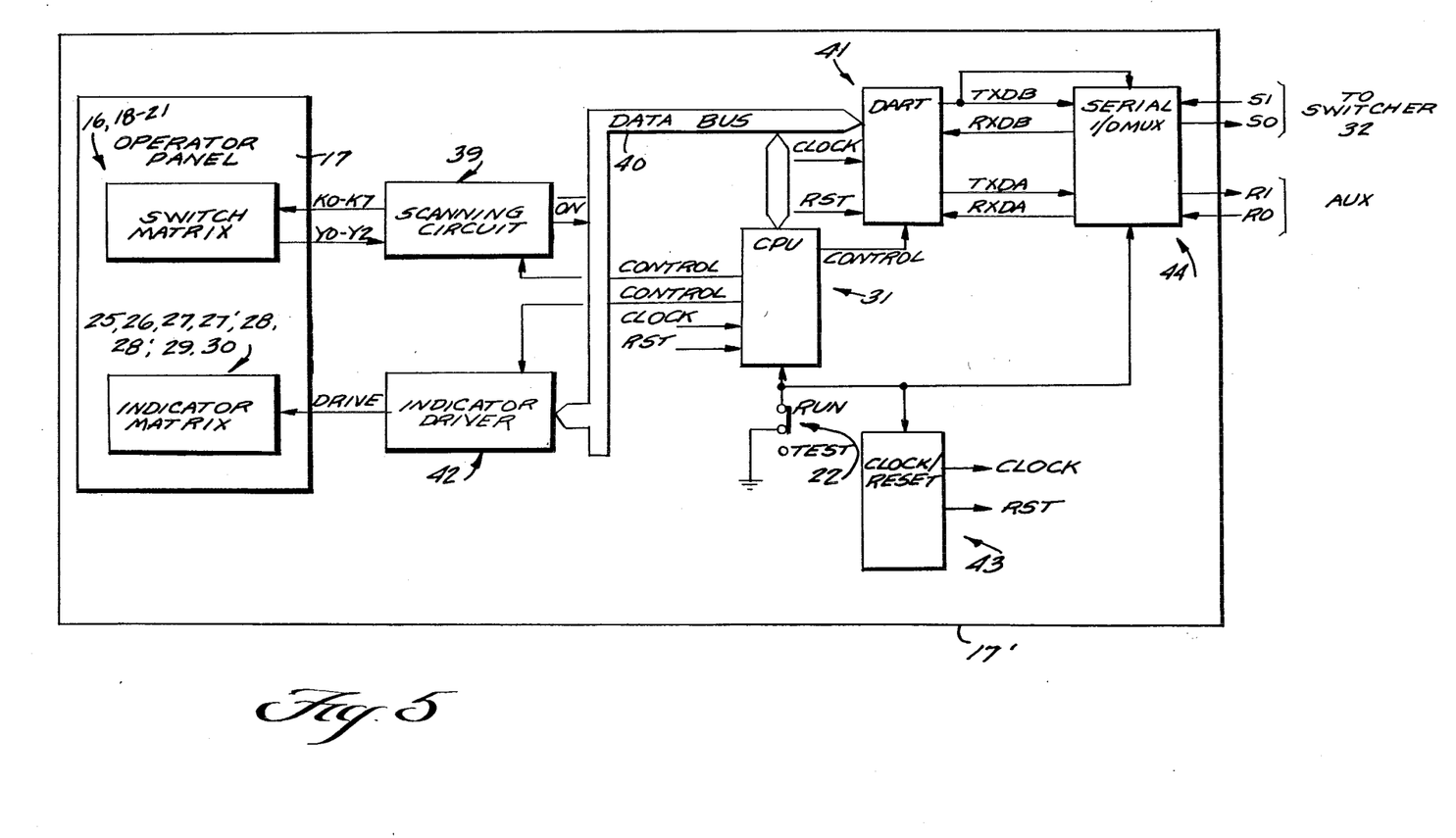
FIG. 5 is a simplified block diagram of an exemplary control console according to the invention.
Figure 6:
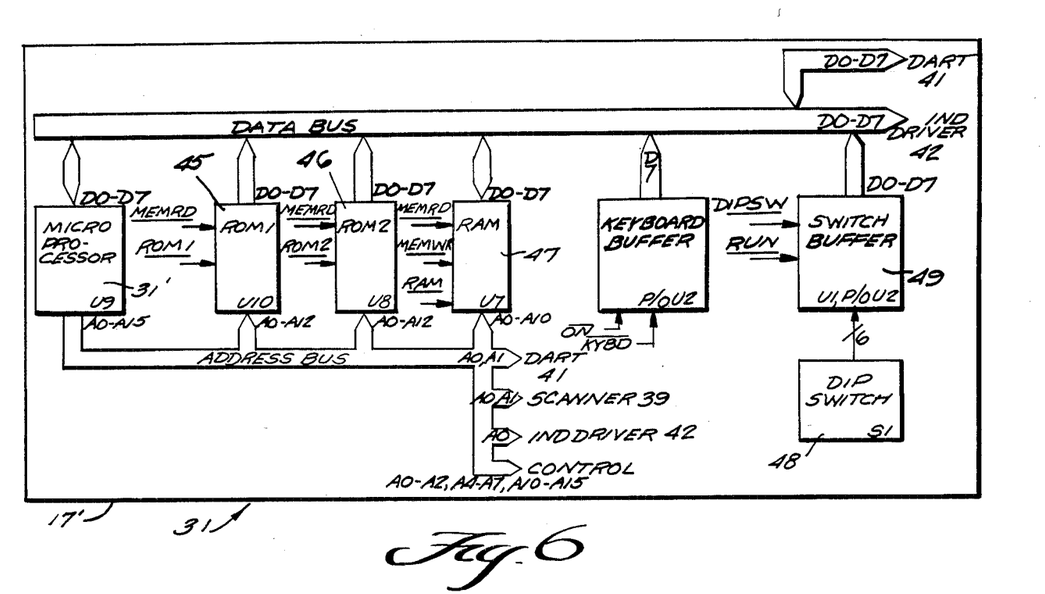
FIG. 6 is a simplified block diagram of an exemplary CPU bussing associated with the control console of FIG. 5.

The major interior operational components of the control console are illustrated in FIGS. 5 and 6. The console 15 at each station 10 is capable of controlling the audio and video switching of the central switch matrix 32, and by control of the switching stations there can be one single net containing all stations 10, or there can be as many individual nets as there are stations 10 (each station 10 connected to itself). The microprocessor 31' included with each control console 15 is reprogrammable, with a mechanical rocker switch arrangement (DIP switch) being provided to appropriately identify the particular station 10, etc.

The microprocessor 31' associated with central processor unit (CPU) 31 (see FIGS. 5 and 6) preferably has two programs, one program for normal operation during which communication exists between the console and the central switch matrix 32, and a self-test mode during which the console is off-line and does not communicate with the matrix 32. In either normal or self-test modes, the CPU 31 scans the switch matrix 16, 18-21 utilizing scanning circuit means 39 and selectively communicates through an 8-bit bi-directional data bus 40 to a dual asynchronous receiver transmitter (DART) 41 or indicator driver circuitry means 42, and controls I/O operations of the DART 41, and writing of data into the indicator drive circuitry means 42. A clock/reset circuit 43 provides asynchronous timing for and resets (initializes) the microprocessor 31' and DART 41, and the microprocessor 31' and DART 41 are operatively connected to a serial multiplexer 44 into which an input SI is fed and from which an output SO is provided.

Provided with the CPU 31 are microprocessor 31', two read-only memories (ROMs) 45, 46, a random access memory (RAM) 47, and a DIP switch 48. The DIP switch 48 is programmed by station number. The microprocessor 31' executes all the operations, being controlled by programmed ROMs 45, 46. The RAM 47 is operatively connected to the push-button switches 16, 18-21 of the control console 17. Buffer 49 is a memory buffer between the control console 15 and the driver 42.

In the normal operational mode, the selection member 22 is set to "run". This enables the serial multiplexer 42 to allow communication with the switcher 32, and informs the microprocessor 31' that it is to perform its normal mode operations. During console receipt, polling, and switcher status, serial data on the line SI is sent through the multiplexer 44 to the DART 41. The DART 41 asynchronously converts the data to 8-bit parallel form, which is then transferred via data bus 40 to the microprocessor 31'. When polling and DIP switch settings match, the microprocessor 31' senses this condition. Switcher status data read from the DART 41 into the microprocessor 31' is processed and transferred back onto the data bus 40 in parallel form. The parallel data is written into the indicator drive circuitry 42, which processes it to drive the indicator matrix, causing the appropriate indicators 25-30 to be operated.

During console transmit, the selection members 16, 18-21 are scanned by the scanning circuitry means 39 and microprocessor 31' for switch closures. Scanning circuitry 39 is mounted on a printed circuit board cooperating with switch matrix 16, 18-21, and is of conventional design. The microprocessor 31' monitors the switch polling via the data bus 40, the polling being sequential so that any new closure is sensed. The microprocessor asynchronously converts switch closure data to 8-bit parallel form which is written into the DART 41, and converted to serial form which is sent to the multiplexer 44 and out the output line S0.

During self-test mode operation, the unit may be utilized to test components of the console 15.

The switch matrix (FIG. 5) includes all of the selection members 16 and 18-21 as illustrated in FIGS. 2 and 3. The selectors 16 and the function selection members 18-21 preferably are momentary contact push-button switches which provide a call function selection (18), a cancel function selection (19), an alternate video function selection (20), and a hold function selection (21). The members 16 and 18-21 bridge contacts on a printed circuit board disposed beneath cover panel 17.

Operation of the system is provided by programming ROMs 45, 46, and feeding signals from contacts bridged by push-button switches 16 and 18-21 to RAM 47, so that the system functions as set forth in the following tables:

CALLING STATION OPERATION

| MODE | CALLER ACTION | | (13) VIDEO MONITOR | (12) INTERCOM NET | (18) MASTER CALL BUTTON LIGHT | (28) HOLD LIGHT | RESULTS — OWN STATION (25) BUSY LIGHT | (26) CALL LIGHT | CALLED STATION BUSY LIGHT | CALLED STATION CALL LIGHT |
|---|---|---|---|---|---|---|---|---|---|---|
| INITIATE CONFERENCE | (1) | Depress call button | On | On | On | Off | Flash | Off | Off Until Accepted Then Lights Steady | Flash Until Accepted Then Lights Steady |
|  | (2) | Depress Called Station Button(s) |  |  |  |  |  |  |  |  |
| CANCEL ANY STATION ON NET | (1) | Depress Cancel Button | On | On | On | Off | Flash | Off |  |  |
|  | (2) | Depress Called Station Button |  |  |  |  |  |  |  |  |
| CANCEL ENTIRE NET | (1) | Depress Cancel Button | Off | Off | Off | Off | Off | Off | Off | Off |
|  | (2) | Master Call or Own Button |  |  |  |  |  |  |  |  |
| TEMPORARILY ANSWER A CALL | (1) | Depress Hold Button | On | On New Net Holding Original | On | On | On | Off | On Calling Station Flashing | On Calling Station |
|  | (2) | Depress Calling Station Button |  |  |  |  |  |  |  |  |
| RETURN TO ORIGINAL NET | (1) | Depress Own Station Key | On | On Original Net | On | Off | Flash | Off | Steady | On Steady |
| CHANGE VIDEO TO ANOTHER SOURCE | (1) | Depress Alt Vid Button | On | On | On | Off | On | Off | Flash New Source Others Ready | On |
|  | (2) | Depress Desired Station Button (Must be on Net) |  |  |  |  |  |  |  |  |
| RETURN OWN PICTURE TO NET | (1) | Depress Alt Vid Button | On | On | On | Off | Flash | Off | On | On |
|  | (2) | Depress Own Station Button |  |  |  |  |  |  |  |  |

CALLED STATION OPERATION

| MODE | CALLER ACTION | | (13) VIDEO MONITOR | (12) INTERCOM NET | (18) MASTER CALL BUTTON LIGHT | (28) HOLD LIGHT | RESULTS — OWN STATION (25) BUSY LIGHT | (26) CALL LIGHT | NEW CALLED STA. BUSY LIGHT | NEW CALLED STA. CALL LIGHT | CALLING STA. BUSY LIGHT | CALLING STA. CALL LIGHT | NEW CALLING STA. BUSY LIGHT | NEW CALLING STA. CALL LIGHT |
|---|---|---|---|---|---|---|---|---|---|---|---|---|---|---|
| BEING CALLED ACCEPT AND ANSWER | HEARS BEEP | | OFF | OFF | OFF | OFF | OFF | OFF |  |  | ON | FLASH |  |  |
|  | (1) DEPRESS CALLING STATION BUTTON | | ON | ON | OFF | OFF | ON | OFF |  |  | ON | ON |  |  |
| DO NOT ACCEPT AND CANCEL CALL | (1) DEPRESS CANCEL BUTTON | | OFF | OFF | OFF | OFF | OFF | OFF |  |  | OFF | OFF |  |  |
|  | (2) DEPRESS CALLING STATION BUTTON | |  |  |  |  |  |  |  |  |  |  |  |  |
| LEAVE OLD NET AND ANSWER NEW CALL | (1) DEPRESS CALLING STATION BUTTON | | ON | ON NEW NET | OFF | OFF | ON | OFF | FLASH | FLASH | ON | OFF | FLASH UNTIL ANSWER THEN ON | FLASH UNTIL ANSWER THEN ON |

-continued

| | | | | | | | | |
|---|---|---|---|---|---|---|---|---|
| HOLD OLD NET AND ANSWER NEW CALL | (1) DEPRESS HOLD BUTTON<br>(2) DEPRESS CALLING STATION BUTTON | ON | ON | OFF | ON | ON | OFF | ON | FLASH | FLASH ON |
| RETURN TO OLD NET | (1) DEPRESS ORIGINAL STATION BUTTON | ON | OFF | OFF | OFF | ON | ON | ON | |
| HOLD OLD NET AND ORIGINAL | (1) DEPRESS HOLD<br>(2) DEPRESS CALL<br>(3) DEPRESS STATIONS WANTED ON NET | ON | ON | ON | ON | ON | OFF | ON | FLASH UNTIL ANSWER THEN ON |
| OWN NET | | | | | | | | | |

Interface Means and Line Driver Assembly

The interface module 37 is illustrated most clearly in FIGS. 1 and 7, and line driver assembly 38 is illustrated most clearly in FIG. 7.

The interface module 37 provides video interface between the camera 11 and the switcher 32, and between the switcher 32 and the video display 13. It also provides audio interface between the microphone 12 and the switcher 32, and between the switcher 32 and the speaker 14. Further, it provides control line interface between the control console 15 with which it is associated, and the line driver assembly 38. It provides DC operating power for the console 15 and contains circuitry for muting audio side tones and controlling the video display 13 AC power relay 50 (see FIG. 1). It consists of two audio channels, control data interface circuits, a relay driver, and a supply.

The audio channels of the interface means 37 include a differential amplifier, audio transformers, and associated components to provide amplification of audio routed from an audio source such as the microphone 12 via the console 15, to an input bus line of the switcher 32 in FIG. 7. Another audio channel consists of another dual differential amplifier, audio transformers, and associated components for providing amplification of audio routed from an output bus line of the switcher 32 to the speaker 14. FIG. 7 illustrates the control data interface circuit, including driver 51 and receiver 52.

The line driver assembly 38 provides the interface between the system controller 35 and the interface means 37 of the respective sections. The switching controller module 35 provides a poll signal (addressed) and switcher status data over serial data line COMM 2 through two buffers 53, to an RS-422 driver 54. The driver 54 converts the data to standard 2-wire RS-422 which is received at the receiver 52. The receiver 52 provides single-wire poll and status data through SI for the control console 15.

The control console 15 responds with a serial switch data output SO and a low request to send RTS signals which enables the driver 51. The driver 51 output is coupled to the RS-422 receiver 55 in the line driver assembly 28, and its serial output is connected to a NAND gate 56. Non-transmitting lines are high, therefore the data on the transmitting line is gated through to the COMM 1 serial data line to the system controller 35. The remaining stations are polled in sequence and transmit switch data back in the same manner.

Audio and Video Automatic Switching Means

The audio and video automatic switching means 34, 33, are conventional components. Exemplary conventional structures that may be utilized for the automatic switching means and associated components include the Dynair System 21 matrix routing switcher, manufactured by Dynair Corporation of San Diego, California.

The video switching means 33 is a blocking type, so that any input signal can be routed to any one or more output buses, but more than one input signal cannot be routed to the same output bus. Several different routings can exist simultaneously.

The audio switching means 34 is a non-blocking type. Any one or more inputs can be connected to any one or more outputs to set up a voice network, and several different networks can exist simultaneously.

System Control Means

The system control means 35 is located in the video frame, and controls both the video 33 and audio 34 switching means in response to commands from each of the control consoles 15. Status indications (indictor energization) at the console 15 are controlled by the system controller 35.

Figure 8:
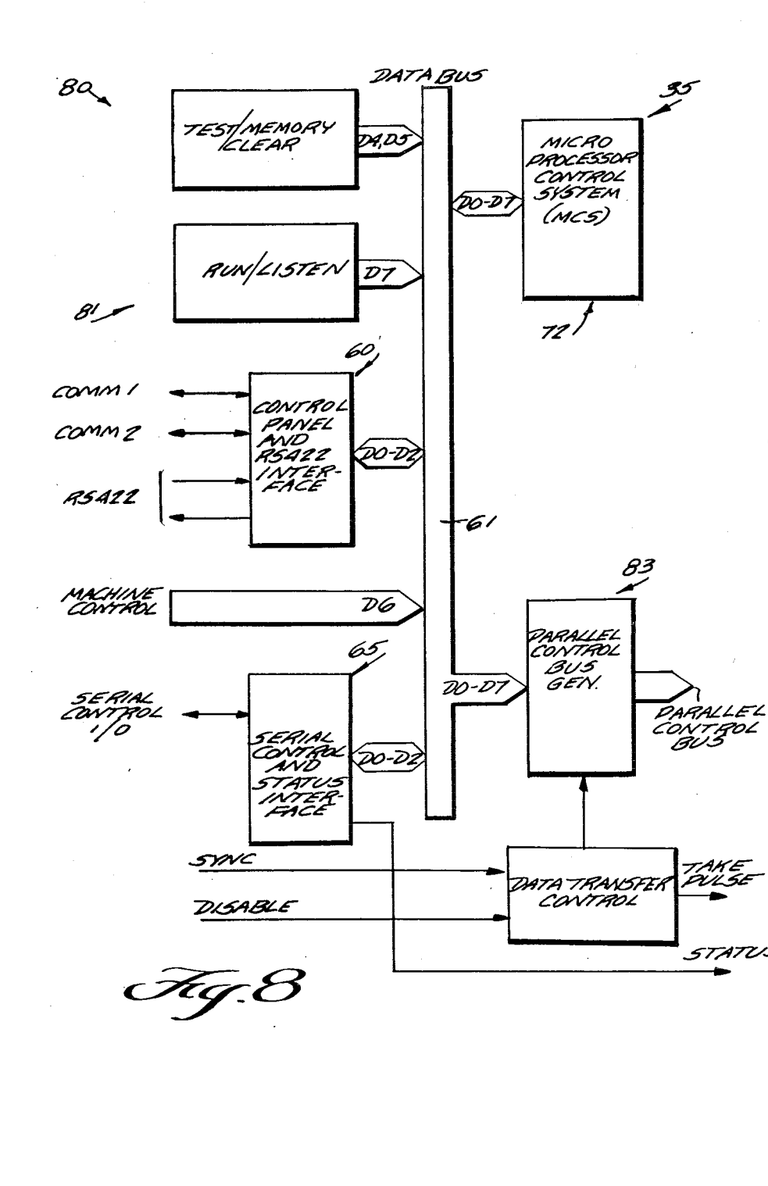
FIG. 8 is a simplified block diagram of an exemplary system control means according to the invention.

A simplified block diagram of the system controller 35 is provided in FIG. 8. The controller 35 performs continuous self-test, and if the test is not performed correctly, a fail-safe circuit disconnects the controller and closes alarm contacts. The controller attempts to restart after disconnect and, if successful, reconnects the system.

The major components of the controller 35 are as follows:

A control panel and RS-422 interface 60 is connected to the line driver assembly 38 (see FIGS. 1 and 7) by lines COMM 1 and COMM 2. The details of the component 60 are provided in FIG. 9. This system provides an interface between the audio and video switching systems 33, 34 and the controller data bus 61. Optionally, switch-request data from an external computer may pass through an operational amplifier 62, inverted, to channel B of DART 63, so that the external computer can override all other controls in an emergency situation or the like. Serial status data output by channel B of DART 63 go through a driver 64 and an RS-422/RS-423 selection switch 65 to the external computer.

Figure 9:
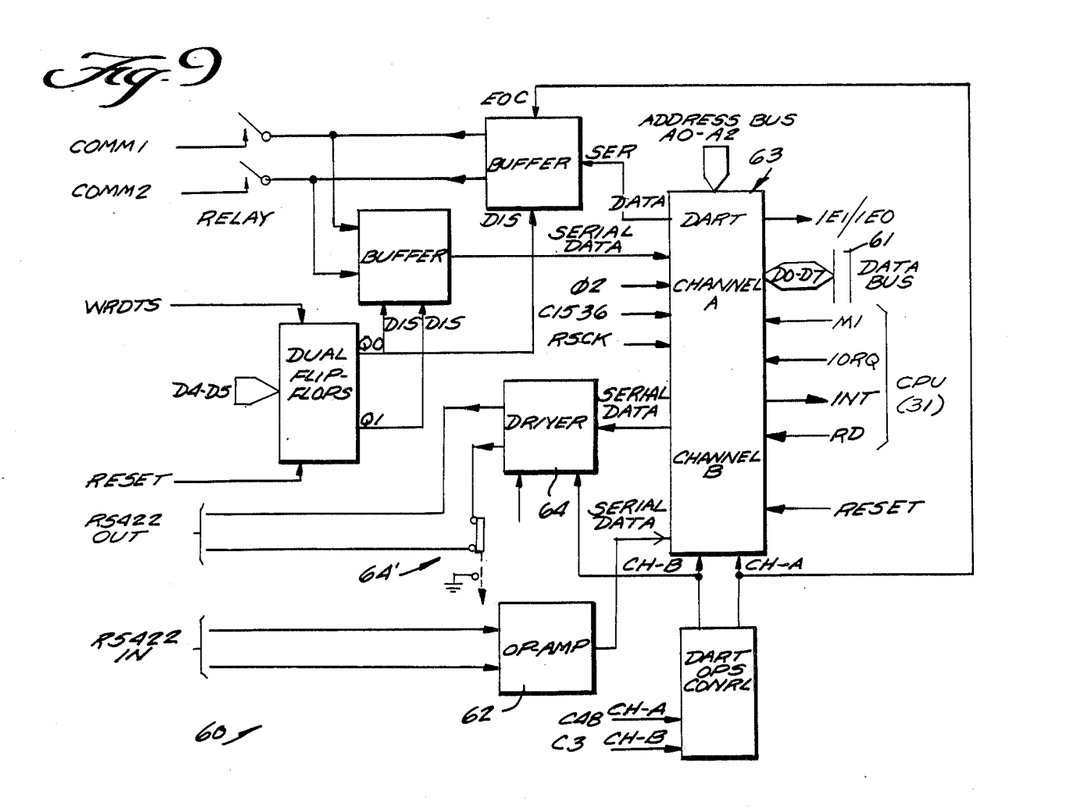
FIG. 9 is a block diagram of the control panel and RS422 interface component of the system control means of FIG. 8.

The DART 63 channel A communicates with the control console 15 over the COMM lines. Serial switch-request data from the COMM lines, as well as the RS-422/RS-423 port, and parallel data from the data bus 61, are stored by the DART 63. Upon receipt of certain control functions, the DART converts the serial data to an 8-bit parallel format and converts the stored parallel data to serial status for transmission by the COMM lines and the RS-422/RS-423 port.

Figure 10:
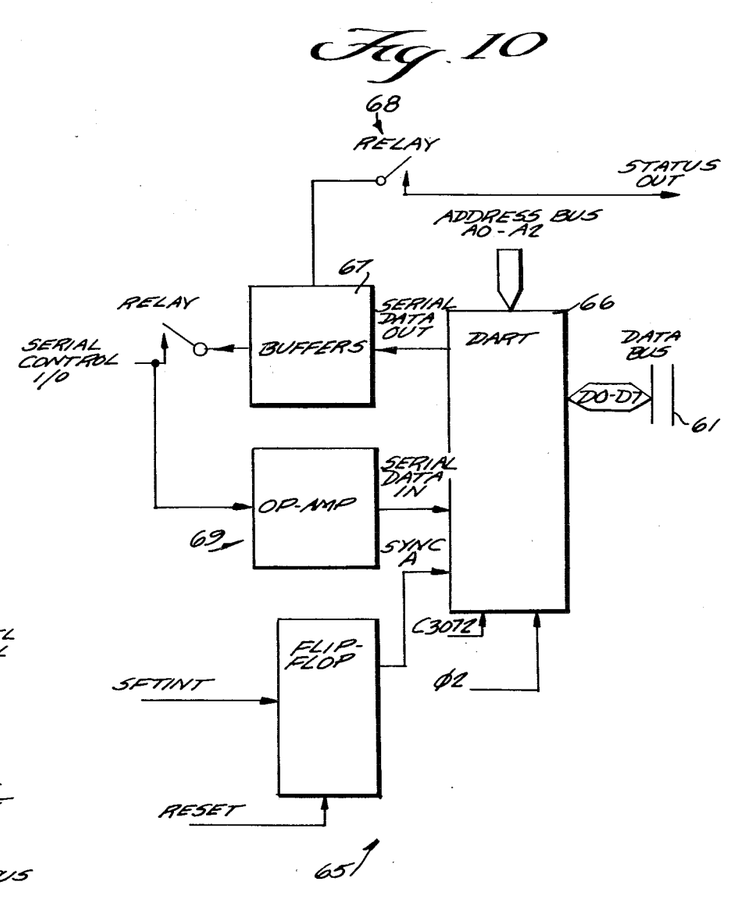
FIG. 10 is a block diagram of the serial control and status generator components of the system controller of FIG. 8.

The serial control and status generator 65 is illustrated in FIG. 10. Serial data is output by channel A of a DART 66 through buffers 67 and relay contacts 68 to the serial control and status lines SI, SO. This data is returned through an operational amplifier 69 to the DART 66 where the legality of the data is checked. Only channel A of the DART 66 is used, this channel outputting serial data for the serial control bus and status bus. Upon receipt of certain control signals the DART 66 converts stored parallel data from the data bus 61 to serial data for transmission.

The DARTs 66, 63 are controlled by signals from a CPU 71 (see FIG. 11) of a microprocessor control system 72. The system also includes a RAM 73 and two ROMs 74, the data ports of which are interfaced to form a tri-state, bi-directional, 8-bit parallel data bus 61. The address information provided by the CPU 71 is interfaced with the RAM 73, the ROMs 74, a 2-input multiplexer 75, and a 1-of-8 decoder 76 through a 16-bit parallel address bus 77. The output of a flip-flop 78 controlled by data bit D7 of bus 61 selects the input of the multiplexer 75, the outputs of which are decoded when the decoder 76 is enabled. The decoder is associated with a 4-input NAND gate 79.

Figure 11:
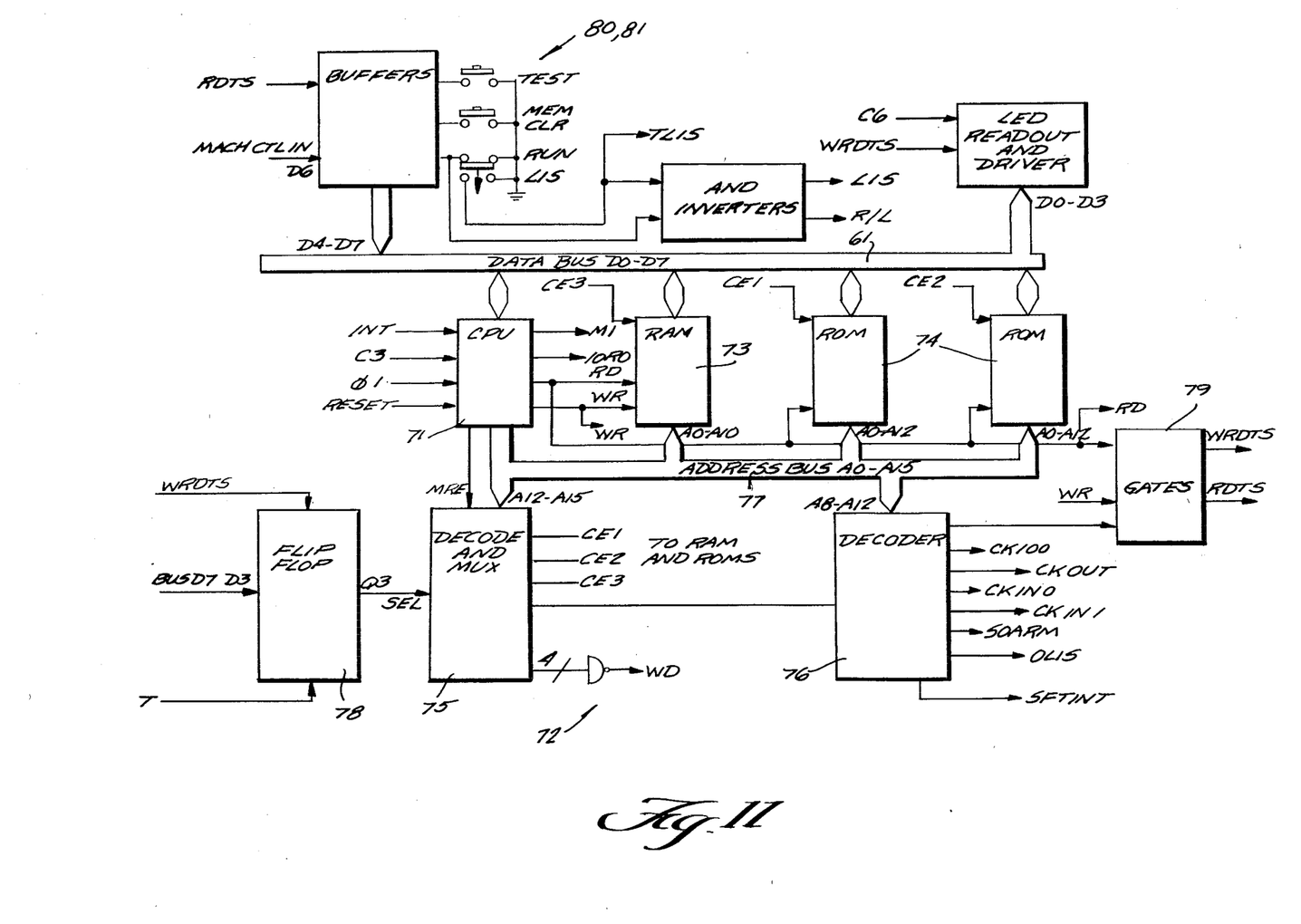
FIG. 11 is a block diagram of the microprocessor control system component of the system controller of FIG. 8.

The test/memory clear and run/listen systems 80, 81 respectively are also illustrated in more detail in FIG. 11.

Figure 12:
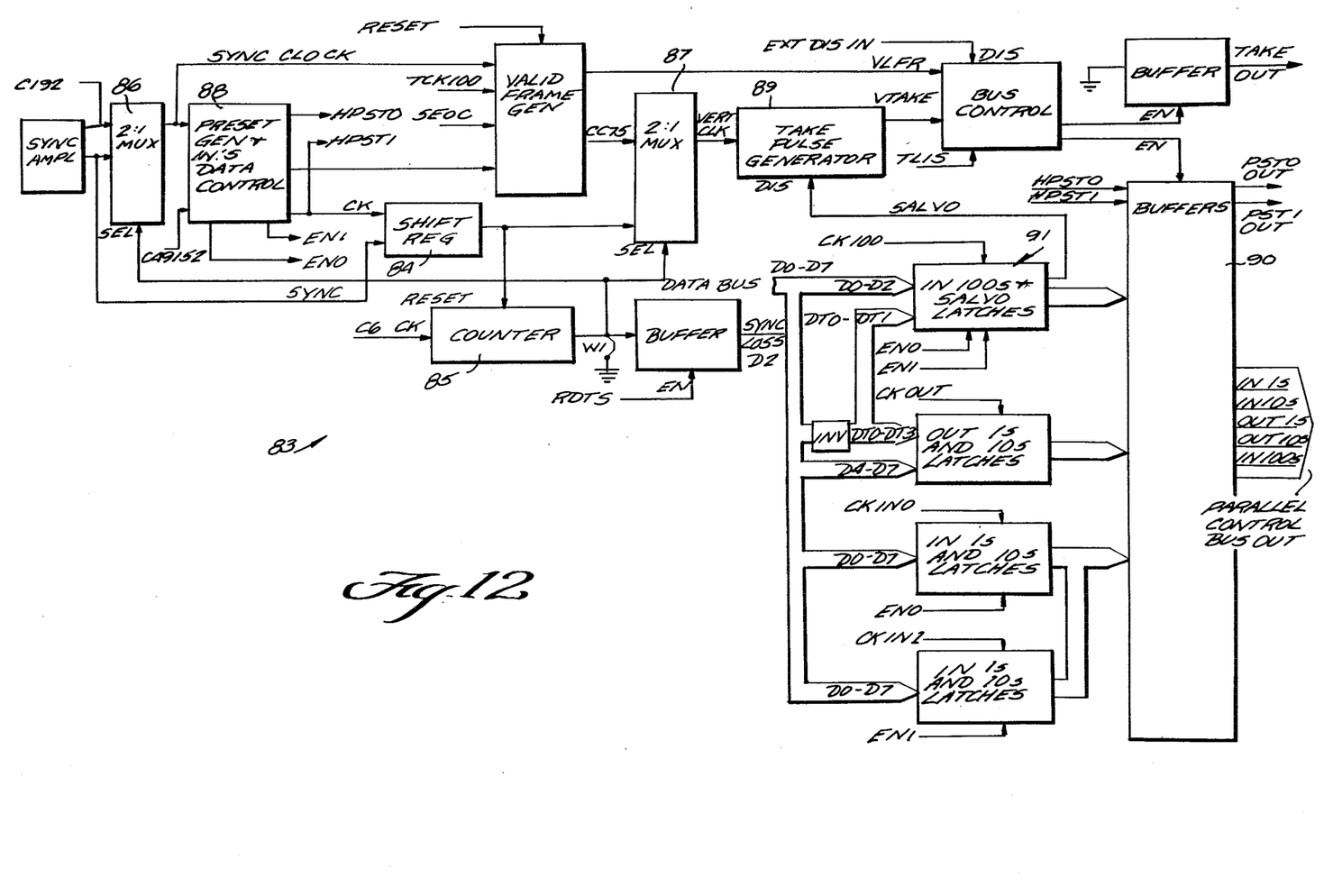
FIG. 12 is a block diagram of the parallel control bus generator component and data transfer control component of the system control means of FIG. 8.

The parallel control bus generator 83 is illustrated in more detail in FIG. 12. The parallel control bus is generated at a rate derived from internal clocks or an external composite sync signal. In the absence of a sync signal the output of the shift register 84 does not go low to reset the 4-bit counter 85; the counter output to the two 2-to-1 selectors 86, 87 is high, selecting clocks CC75 and C192. If a sync signal is present, the shift register 84 output goes low to reset the counter 85, the counter output goes low and the sync signal and the register output are selected. The selected signals clock the preset generator 88 and INs data control circuits and the take-pulse generator 89.

When the buffers 90 are enabled they output the input in an output address data in the latches 91. The data on the data bus 61 is clocked into the latches 91 through hard-wired enabled inputs as required according to the data on the bus.

Miscellaneous

While the system has been described as containing a plurality of send/receive stations each with a control console 15, the system also may utilize a wide variety of other stations having only send or receive capabilities, or without a controller 15, but rather specialized data collection, storage, or analyzing equipment. For instance, an accessory station illustrated schematically at 100 in FIG. 1 can include a specialized input or output (i.e. peripheral device) 101 connected up via an interface means 102 to the line driver assembly 38 and the video and/or audio matrices 33, 34. The specialized input or output (i.e. peripheral device) may comprise a wide variety of structures, such as a video recorder or playback machine, a computer or other data or analysis source, or a computerized interactive color image graphics system.

Again, it should be pointed out that while the system has been described with respect to teleconferencing, other end uses are also within its scope.

It will thus be seen that according to the present invention a relatively simple yet extremely versatile conferencing system has been provided which allows each station to act as a master and set up a network with any one or more other stations without hard-wiring from each station directly to each other station, and while allowing parallel and private networks to be set up. The system also provides each master with great flexibility in adding and subtracting members from the network at will, patching into the network, alternately viewing video data from the independent video sources associated with each net member, and the like.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A controlled access automated-switching conferencing system comprising:

a plurality of stations each including an audio input and a wideband input and an audio output and a wideband output;

a control console disposed at each station, each console controlled by a station microprocessor at each station, and each said console including function and station selection members operatively interconnected to said station microprocessor central automatic distinct audio switching means and wideband switching means for switching said audio and wideband inputs so that they may be connected to any one or more of said audio and wideband outputs;

central system control means, having a microprocessor, for controlling said audio switching means and said wideband switching means in response to selections of function and station selection members associated with any of said control consoles, the central system control means microprocessor detecting the selections by polling all station control consoles to determine the status of the function and station selection members;

interface means associated with each station for operatively interconnecting said station control console, inputs, and outputs with said system control means;

central line driver means for interfacing said system control means with said interface means; and each said station microprocessor including means for controlling selective connection of any wideband input to any one or more wideband outputs, and any audio input to any one or more audio outputs, through said interface means and said central system control means, to provide selective connection of each station to any selected one or more other stations, with control over connections to a station being provided at each individual station.

2. A system as recited in claim 1 wherein said audio switching means is a non-blocking switching means, comprising means for switching each of said audio outputs so that it may be connected to one or more of said audio inputs.

3. A system as recited in claim 2 wherein said wideband switching means is a blocking switching means.

4. A system as recited in claim 3 wherein said wideband inputs and outputs are video, and wherein said wideband switching means comprises video switching means.

5. A system as recited in claim 4 wherein said video inputs each comprise a video source, and said video outputs each comprise a video display.

6. A system as recited in claim 5 wherein at least some of said video sources each comprise a high resolution color camera.

7. A system as recited in claim 4 wherein each said interface means comprises means for providing: video interface between said video input, said video switching means, and said video output; audio interface between said audio input, said audio switching means, and said audio output; and control interface between said control console and said line driver means.

8. A system as recited in claim 1, further comprising at least one accessory station, said accessory station including at least one peripheral device, and an accessory station interface means for operatively interconnecting said at least one peripheral device to said system control means for ultimate switching by said automatic switching means.

9. A system as recited in claim 8 wherein said accessory station includes a peripheral device which comprises a computerized interactive color image graphics system.

10. A system as recited in claim 8 wherein said accessory station includes a peripheral device which comprises a video recorder and playback machine.

11. A system as recited in claim 1 wherein each said interface means comprises means for providing power for its respective control console.

12. A system as recited in claim 1 wherein each said control console includes a programmed ROM operatively connected to said station microprocessor, and a RAM operatively connected to said selection members and said station microprocessor.

13. A system as recited in claim 12 wherein each said control console further comprises a dual asynchronous receiver and transmitter operatively connected to said station microprocessor, and a serial multiplexer.

14. A system as recited in claim 1 wherein each said control console includes indicator means associated with each of said station selection members.

15. A system as recited in claim 14 wherein said indicator means associated with each station selection member comprises a pair of indicating light members of different color.

16. A system as recited in claim 15 wherein each said control console function selection members comprises a hold function selecting means, a call function selecting means, and a cancel function selecting means.

17. A system as recited in claim 16 wherein said function selection members associated with each control console further comprise an alternate first input function selecting means.

18. A system as recited in claim 1 wherein said station microprocessor comprises means for continuously self-testing components of the control console with which it is associated.

19. A method of providing controlled access automated-switching between a plurality of conferencing stations each having at least a wideband input and a wideband output, without requiring hard-wiring from each station directly to each other station, comprising the steps of:
  disposing a control console at each conferencing station, the control console including a microprocessor, and function and station selection members, a station selection member being provided at each control console for each of said plurality of conferencing stations;
  providing automatic switching at a central control station for switching the wideband inputs so that they may be connected to any one or more of the wideband outputs;
  polling, from said central control station, the control console at each conferencing station to determine the status of the function and station selection members;
  in response to said polling, at a central location, controlling the automatic switching with a central microprocessor to determine actuations of function and station selection members associated with any one of the control consoles so that each control console may act as a master for the entire system; and
  controlling the switching step with the microprocessor disposed at each conferencing station and the central microprocessor so that parallel and private continuous networks may be set up between any of the stations.

20. A method as recited in claim 19 wherein each station includes an audio input and a video input, and an audio output and a video output, and wherein said automatic switching and control steps are practiced to connect any video input to any one or more video outputs, and any audio input or output to any one or more other audio outputs or inputs.

21. A controlled access automated-switching conferencing system comprising:
  a plurality of stations each including audio and video distinct inputs and audio and video distinct outputs;
  a control console disposed at each station, each console controlled by a station microprocessor at each station, and each said console including function and station selection members operatively interconnected to said station microprocessor;
  central automatic distinct audio and video switching means for switching said audio and video inputs so that they may be connected to any one or more of said audio and video outputs, and establish a constant audio bridge when connecting any audio input to one or more audio outputs;
  central system control means for controlling said audio and video switching means in response to selections of function and station selection members associated with any of said control consoles, the central system control means detecting the selections by polling the control consoles at the stations to determine the status of said function and station selection members, said central system control means comprising a central microprocessor.

22. A system as recited in claim 21 wherein said audio switching means is a non-blocking switching means, and wherein said video switching means is a blocking switching means.

23. A system as recited in claim 21 further comprising at least one accessory station, said accessory station including at least one input or output, and an accessory station interface means for operatively interconnecting said at least one input or output to said system control means for ultimate switching by said automatic switching means.

24. An audio and wideband conferencing system, comprising:
  first remote console means having first audio inputs and outputs, first wideband inputs and outputs, a first plurality of function selection switches, a first plurality of station selection switches, and a first microprocessor, for providing communications input/output to said system, said first microprocessor providing a first signal in response to activation of one of said first plurality of function selection switches and said first plurality of station selection switches;
  second remote console means having second audio inputs and outputs, second wideband inputs and outputs, a second plurality of function selection switches, a second plurality of station selection switches, and a second microprocessor, for providing communications input/output to said system, said second microprocessor providing a second signal in response to activtion of one of said second plurality of function selection switches and said second plurality of station selection switches;
  central switching means, coupled to said first and second remote control means, for forming audio and wideband communications networks in said system, said central switching means including audio switching means and wideband switching means;
  central control means, coupled to said central switching means and to said first and second remote console means and having a third microprocessor, for controlling the formation of said communications networks, and for polling said first and second remote console means to detect said first and second signals, said control means causing said central switching means to form a first communications network in response to detecting said first signal, and a second communications network in response to detecting said second signal.

25. A system according to claim 24 wherein said central control means continuously polls said first and second remote console means at a rate of 1000 times per second.

26. A system according to claim 24 wherein said central switching means forms said first and second communications networks to cause said networks to exist simultaneously.

27. A system according to claim 24 wherein said audio switching means is a non-blocking switching means, comprising means for switching each of said audio outputs so that it may be connected to one or more of said audio inputs.

28. A system according to claim 24 wherein said wideband switching means is a blocking switching means.

* * * * *